(12) United States Patent
Akhundzada

(10) Patent No.: US 9,578,472 B2
(45) Date of Patent: Feb. 21, 2017

(54) METHOD OF SENDING AND RECEIVING MAIL USING INTERNATIONAL MOBILE SUBSCRIBER IDENTITY AND WITHOUT KNOWING AN EMAIL ADDRESS OF THE RECIPIENT

(71) Applicant: Shahin Akhundzada, Baku (AZ)

(72) Inventor: Shahin Akhundzada, Baku (AZ)

( * ) Notice: Subject to any disclaimer, the term of this patent is extended or adjusted under 35 U.S.C. 154(b) by 474 days.

(21) Appl. No.: 13/781,897

(22) Filed: Mar. 1, 2013

(65) Prior Publication Data

US 2014/0248855 A1   Sep. 4, 2014

(51) Int. Cl.
*H04M 1/725* (2006.01)
*H04W 4/12* (2009.01)
*H04W 4/00* (2009.01)

(52) U.S. Cl.
CPC ............... *H04W 4/12* (2013.01); *H04W 4/003* (2013.01)

(58) Field of Classification Search
CPC .................................. H04W 4/12; H04W 4/003
See application file for complete search history.

(56) References Cited

U.S. PATENT DOCUMENTS

| | | | |
|---|---|---|---|
| 2008/0140849 A1* | 6/2008 | Collazo | 709/229 |
| 2009/0144269 A1* | 6/2009 | Collet | H04L 29/1215 |
| 2013/0091227 A1* | 4/2013 | Bhakar et al. | 709/206 |
| 2014/0019559 A1* | 1/2014 | Schultz | 709/206 |
| 2014/0128040 A1* | 5/2014 | Guglielmo et al. | 455/414.1 |

* cited by examiner

*Primary Examiner* — Keith Fang
(74) *Attorney, Agent, or Firm* — Anna Vishev, Esq.

(57) ABSTRACT

A method of providing an email service for any International Mobile Subscriber Identity (IMSI) allowing its user to send an email to any IMSI without knowing the email address of the recipient. If the recipient is not already registered with this service, a mail box is created for such recipient and he/she is provided with email access details. The method can be performed using mobile phones, tablets and personal computer systems.

7 Claims, 8 Drawing Sheets

METHOD OF SENDING AND RECEIVING MAIL USING INTERNATIONAL MOBILE SUBSCRIBER IDENTITY AND WITHOUT KNOWING AN EMAIL ADDRESS OF THE RECIPIENT

FIELD OF THE INVENTION

The present invention relates to a method of sending and receiving entails that enhances the functionality of a traditional email system by allowing emails to be send to any IMSI, the method can be used on mobile phones, tablets and personal computer systems. Platforms include iOS, Android, Windows Phone, Windows and Mac.

BACKGROUND OF THE INVENTION

Occasionally, users have a need to send an email to a recipient whose email address users do not know. However, in many such instances, users know the recipient's mobile phone number, i.e., its International Mobile Subscriber Identity (IMSI). Traditional email systems do not allow sending of an email without it valid email address. Accordingly, there is a need in the art for a way to not only send an email to any IMSI without knowing anything else, but also to use existing entailing features to send such email to any IMSI without requiring lots of configuration and hassle.

SUMMARY OF THE INVENTION

In its general aspect, the invention provides an enhanced mail service which allows a user to send an email to any IMSI without knowing the email address of the recipient. If the recipient is not already registered with this service, a mail box is created for such recipient and he/she is provided with email access details.

In one specific aspect, this service can be used through specially developed IMSI mail client application installed on a user's mobile device. In other embodiments, an IMSI mail web client or a conventional email client (e.g., Outlook) can be utilized.

In another specific aspect, where the user's mobile device is a mobile phone, the user will only need to install the IMSI mail client application to use the service, and no further configuration will be necessary. User will be able to send email on IMSI or receive emails on his/her IMSI right after the application is installed.

On tablets and desktop computer systems, user can register by providing his/her IMSI. Registration process is completed by user entering a code which was sent to user-provided IMSI. This service also supports email sending to traditional email addresses, and provides all common emailing features, e.g., "send", "forward", "reply", "reply to all", "attachment(s)", "CC", "BCC", etc.

BRIEF DESCRIPTION OF DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
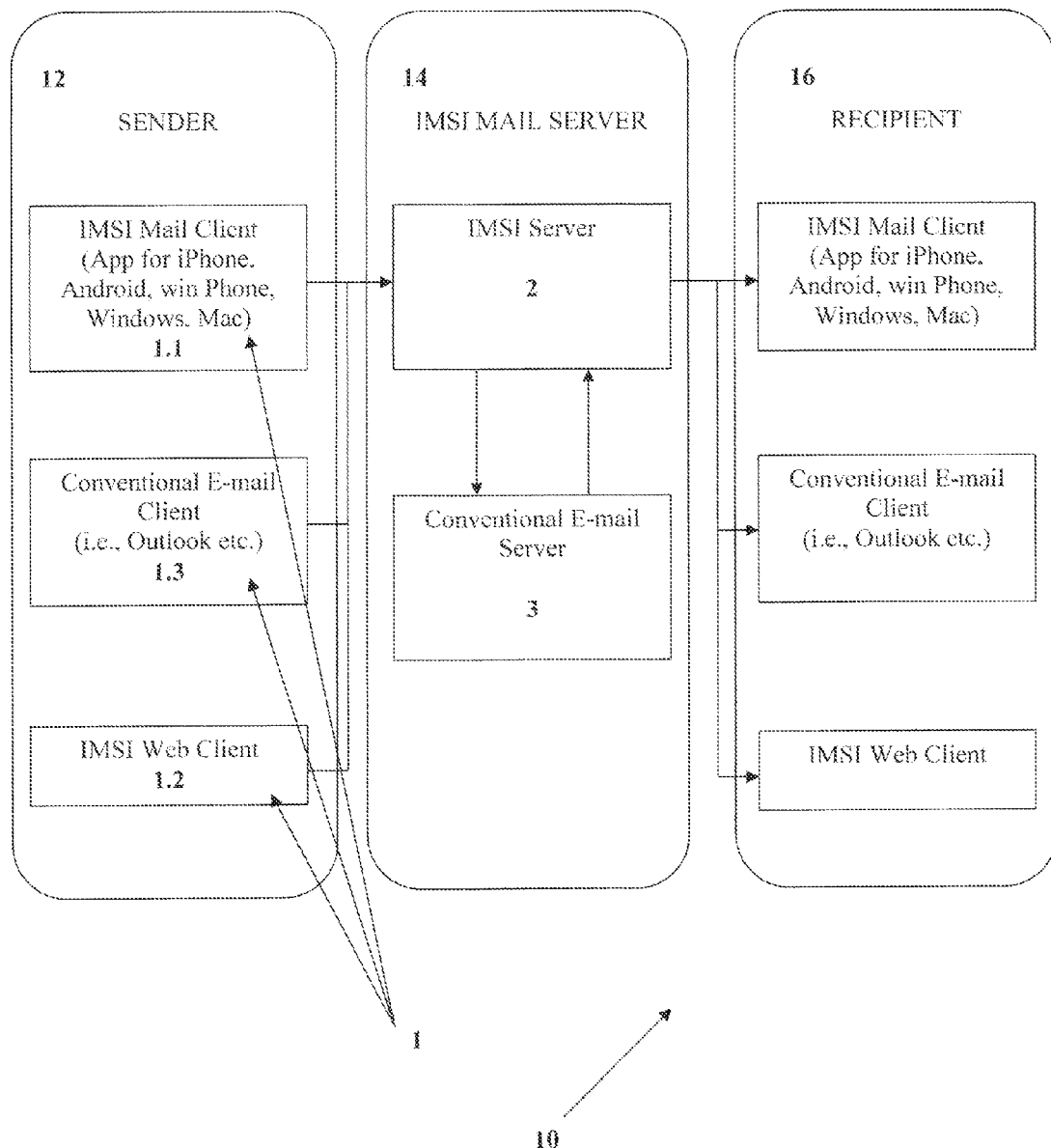
FIG. 1 is a schematic diagram illustrating the IMSI mailing system in accordance with the preferred embodiment.
Figure 2:
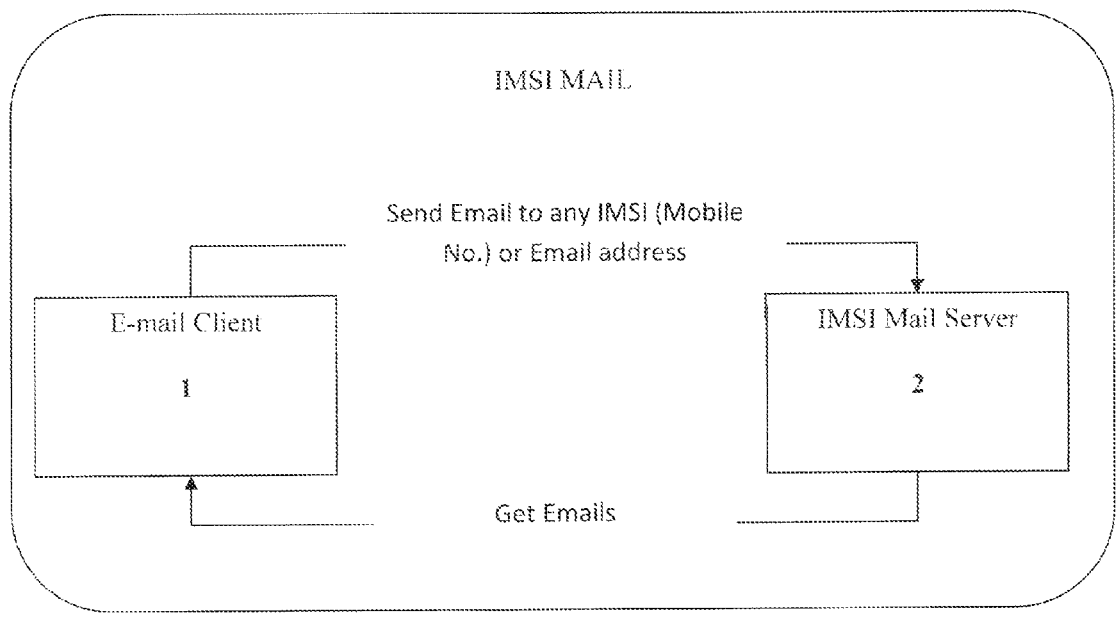
FIG. 2 is a diagram illustrating general components and processes provided by the IMSI mailing system in accordance with the preferred embodiment.

Referring now to the drawings, in which like numerals represent the same or similar elements, and, initially, to FIG. 1, in which an exemplary embodiment of the International Mobile Subscriber Identity (IMSI) mail system is illustrated. Specifically, the IMSI mail system 10, in its preferred embodiment, includes a sender system 12, an IMSI mail server system 14 and a recipient system 16. As shown in FIG. 2, user can send email to any IMSI or email address through email client 1 supporting multiple platforms using IMSI mail server 2. The IMSI mail server 2 preferably includes a recording medium (not shown) for storing mail boxes, emails and other related information therein. Additionally, as shown in FIG. 1 as conventional e-mail server 3 can be provided within the IMSI mail server system 14.

Figure 3:
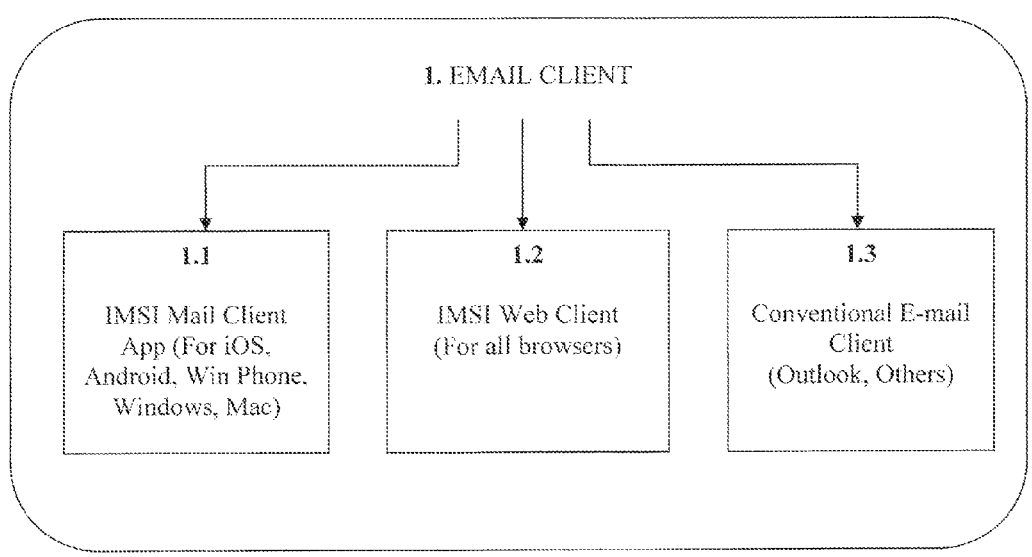
FIG. 3 is a diagram illustrating different mail clients which can be used with the IMSI mailing system in accordance with the preferred embodiment.

As shown in FIGS. 1 and 3, email client 1 can be an IMSI mail client application 1.1 installed on a user device and specifically operable on different device operating systems, e.g., iOS, Android, Windows Phone, Windows and Mac; an IMSI mail web client 1.2. i.e., a client application accessible via the Internet; or any conventional email client 1.3, e.g., Outlook, etc.

Figure 4:
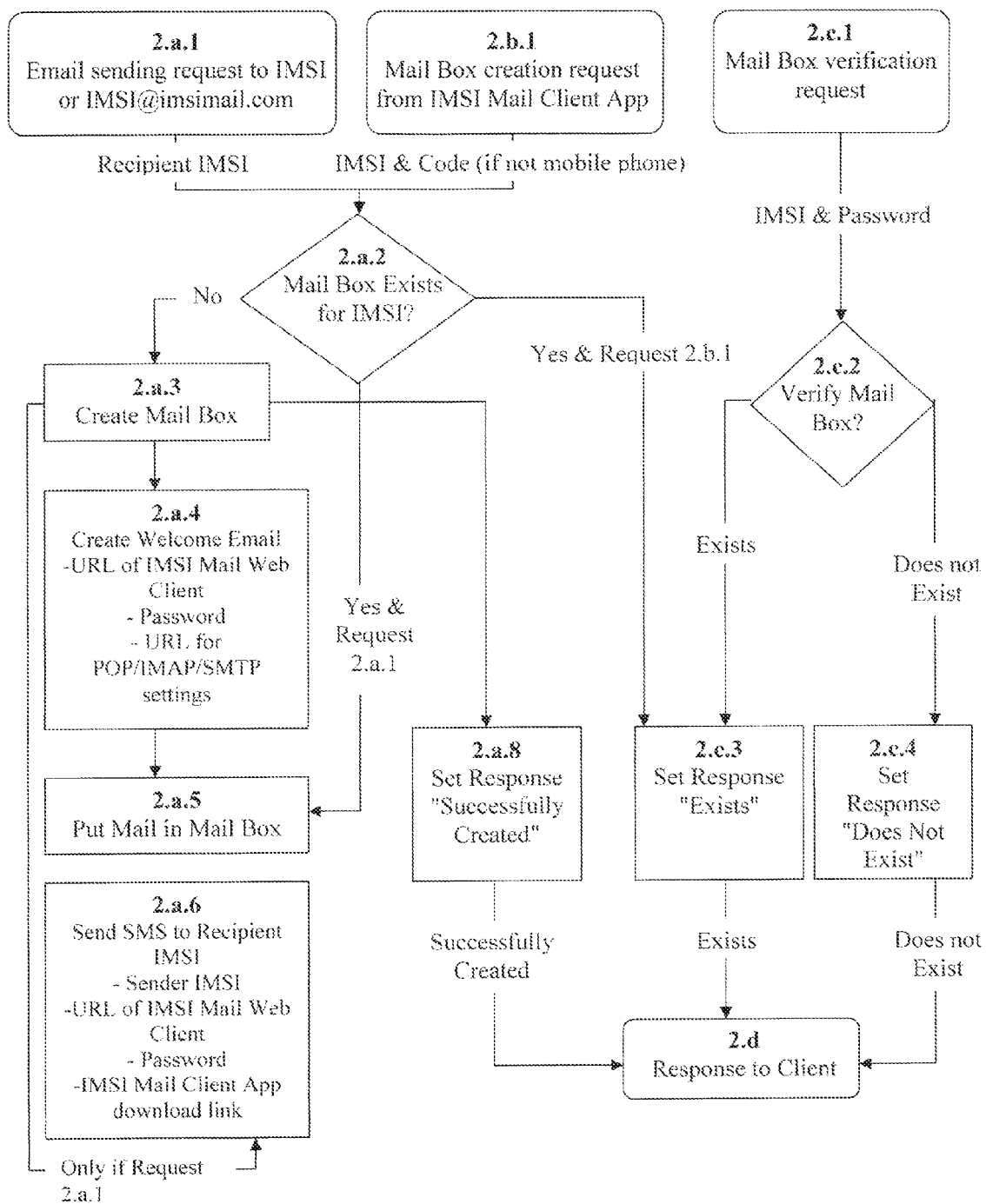
FIG. 4 is a diagram illustrating server side features and processes of the IMSI mailing system in accordance with the preferred embodiment.

The process performed by IMSI mail server 2 is further illustrated in FIG. 4. In accordance with the preferred embodiment, server 2 receives an email sending request (Step 2.*a*.1) to a recipient's IMSI or IMSI@imsimail.com address from email client 1, or a mail box creation request (Step 2.*b*.1) from IMSI mail client application 1.1. Alternatively, Server 2 can also receive a mail box verification request (Step 2.*c*.1) discussed further below. On receiving the email sending request (Step 2.*a*.1), server 2 will check if a recipient mail box exists (Step 2.*a*.2). If the recipient mail box exists server 2 will place mail into the existing mail box (Step 2.*a*.5). Otherwise, server 2 will create a new recipient mail box (Step 2.*a*.3), a welcome email to the recipient (Step 2.*a*.4) and will place both the sender's email and the welcome e-mail into the newly created mail box (Step 2.*a*.5). Further, to alert the recipient, server 2 will send a communication (e.g., SMS) to the recipient's IMSI address (Step 2.*a*.6) to provide the email access details.

On receiving the mail box creation request (Step 2.*b*.1) from the IMSI mail client application 1.1, server 2 will verify if a mail box exists (Step 2.*a*.2) for the requestor's IMSI. If mail box does not exist, server 2 will then create a mail box (Step 2.*a*.3) and will send a "Successfully Created" message as a response to the email client 1 (Steps 2.*a*.8; 2.*d*). Similarly to the steps discussed above server 2 will also create a welcome email (2.*a*.4) and will place the welcome email into the newly created mail box (Step 2.*a*.5).

On receiving the mail box verification request (Step 2.*c*.1) from the email client 1, server 2 will verify existence of the mail box (Step 2.*c*.2) using the requestor's IMSI and password. If the mail box exists, server 2 will send a response "Exists" to the requestor (Steps 2.*c*.3; 2.*d*). Otherwise, it will send a response "Does Not Exist" (Steps 2.*c*.4; 2.*d*). It should be noted that, in the preferred embodiment, the Step 2.*c*.2 (mail box verification) may be performed at the conventional email server 3.

Figure 5:
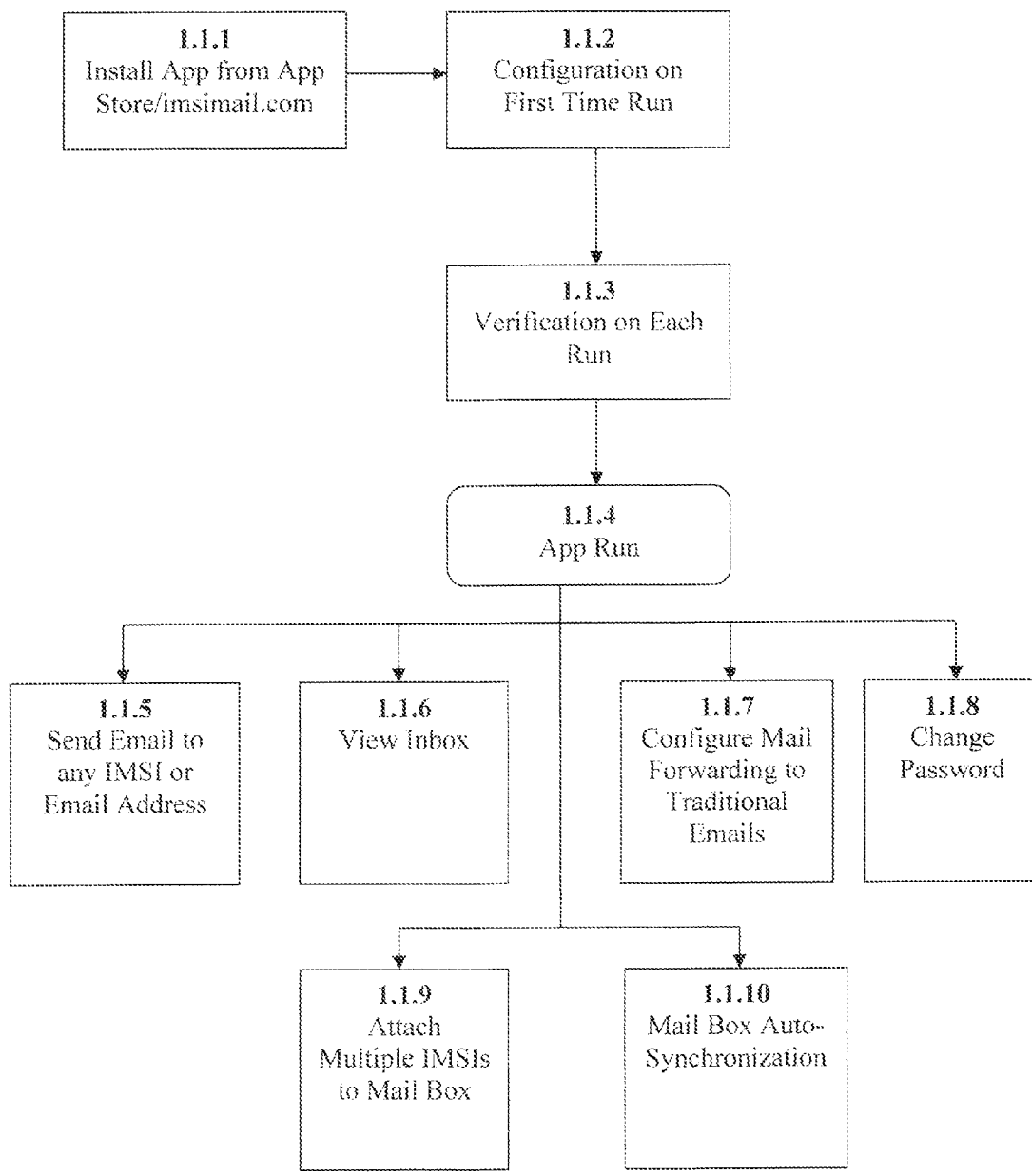
FIG. 5 is a diagram illustrating features of a client application of the IMSI mailing system in accordance with the preferred embodiment.

Processes performed at the IMSI mail client application 1.1 are illustrated in FIG. 5. Client application 1.1 can be conventionally installed, e.g., from an Application Store, or from imsimail.com (Step 1.1.1). On running the client application 1.1 for the first time, the process of configuration is performed (Step 1.1.2), as described below with respect to FIG. 6. Further, during each run of the client application 1.1, the process of verification is performed (Step 1.1.3). After running the client application successfully, a user can send an email to any IMSI or email address (Step 1.1.5), can view the inbox (Step 1.1.6), can configure email forwarding to traditional entails (Step 1.1.7), can change password (Step 1.1.8), and/or can attach other multiple IMSIs to the same mail box (Step 1.1.9). Client application 1.1 is also configured to perform mail box auto synchronization (Step 1.1.10) periodically.

Figure 6:
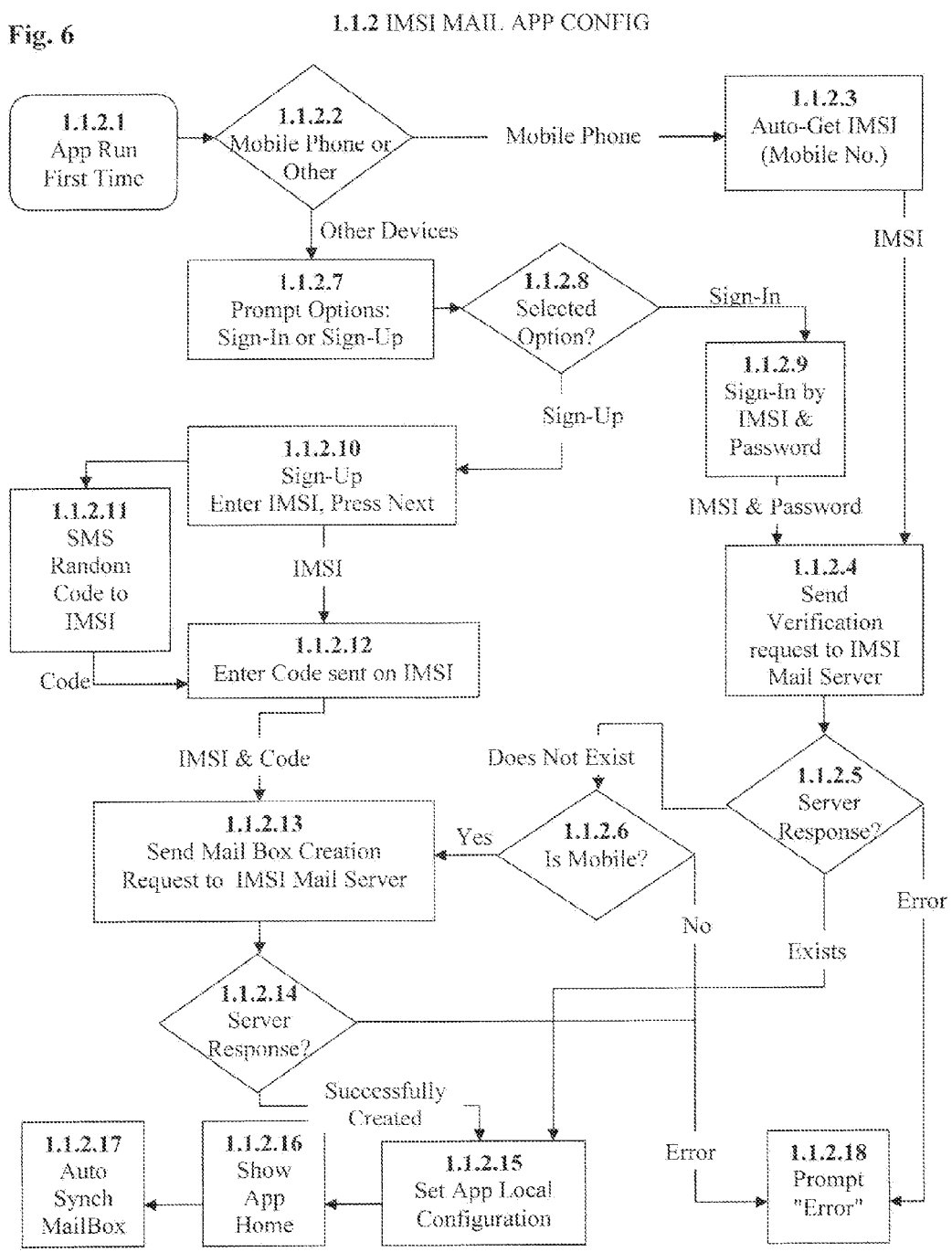
FIG. 6 is a diagram illustrating configuration process on first run of the client application.

As shown in FIG. 6, in the preferred embodiment of the invention, upon running the IMSI mail client application 1.1 for the first time (Step 1.1.2.1), the client application checks the user device to determine whether it is a mobile phone or any other device (Step 1.1.2.2). If the user device is a mobile phone, then the application obtains the IMSI (Step 1.1.2.3) and sends a verification request to IMSI mail server (Step 1.1.2.4) by providing IMSI. Application then checks the server response (Step 1.1.2.5). If the response is "Does Not Exist," then application 1.1 sends a mail box creation request to the IMSI mail server (Step 1.1.2.13). Next, Application again checks the server response (Step 1.1.2.14). If the response is "Successfully Created," the local configuration is set (Step 1.1.2.15), application home is displayed to the user (Step 1.1.2.16), and mail box synchronization is performed (Step 1.1.2.17). Otherwise, an error message is prompted to the user (Step 1.1.2.18).

If the client application determines that the user's device is not a mobile phone, it prompts a sign-in or sign-up option (Step 1.1.2.7) and checks the option selected by the user (Step 1.1.2.8). If the user selects the "Sign-In" option, the application allows the user to sign-in using his/her IMSI and password (Step 1.1.2.9). Otherwise, the application displays the sign-up screen. At the sign-up screen, the user is prompted to enter the IMSI (Step 1.1.2.10). Thereafter, a random security code is sent to the provided IMSI, preferably, using SMS or any other similar channel, (Step 1.12.11) and code input is prompted. User then enters the provided security code (Step 1.1.2.12), and the application sends the mail box creation request to the IMSI mail server 2 (Step 1.1.2.13) providing the requestor's IMSI and the code. Application then checks the server response (Step 1.1.2.14), and, if the response is "Successfully Created," the local configuration is set (Step 1.1.2.15). Application home is then displayed to the user (Step 1.1.2.16) and mail box synchronization step (Step 1.1.2.17) is performed. Otherwise, the error message is displayed to the user (Step 1.1.2.18).

Figure 7:
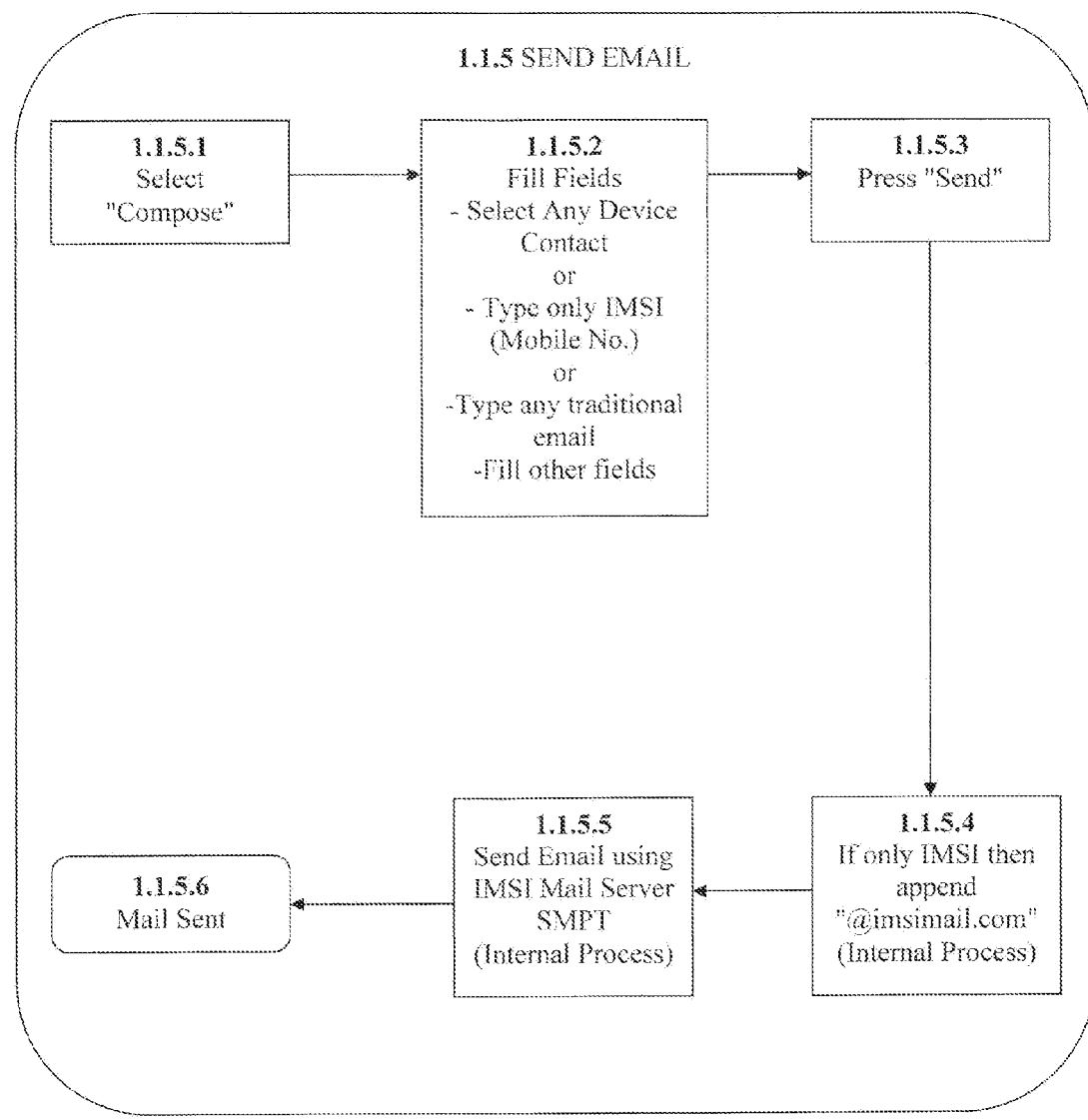
FIG. 7 is a diagram illustrating email sending process in the client application.

The process of sending email using the IMSI mail client application is illustrated in more detail in FIG. 7. To send an email to any IMSI or email address, a user first selects a "Compose" option (Step 1.1.5.1), and an email form is then shown to the user. User can then select a device contact or type in any IMSI or email address (Step 1.1.5.2), and press send (Step 1.1.5.3). Multiple recipients can be selected and/or entered into the "To", "CC" and "BCC" fields. Application 1.1 then verifies the recipients: if any of the recipients only has the IMSI listed, the application appends "@imsimail.com" to the IMSI of the recipient to create a complete IMSI mail address (Step 1.1.5.4). This artificially constructed address indicates to the server that the mail is intended for the mail box of a recipient having the corresponding IMSI. Application then sends the email through the IMSI mail server SMTP (Step 1.1.5.5), and the user is notified that the mail is successfully sent to the recipient (1.1.5.6).

Figure 8:
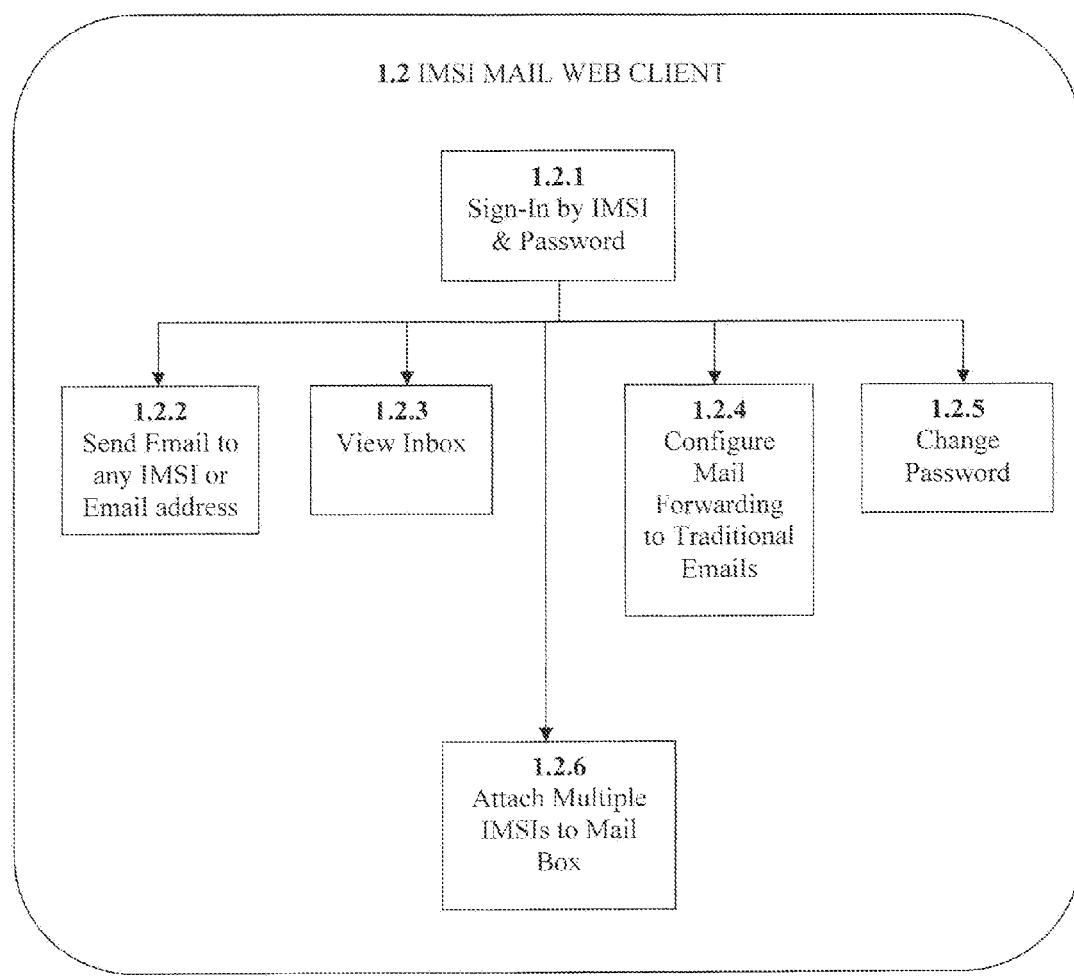
FIG. 8 is a diagram illustrating features of a web client.

Instead of using a mobile device, a user may send email messages using the presently disclosed system by utilizing a IMSI mail web client 1.2, as shown in FIG. 8. User can access web client 1.2 in any browser, and sign in using the IMSI and password (Step 1.2.1). After successfully signing in, the user can send email to any IMSI or email address (Step 1.2.2), can view the inbox (Step 1.2.3), can configure email forwarding to traditional emails (Step 1.2.4), can change the password (Step 1.2.5), and/or can attach other multiple IMSIs to the mail box (Step 1.2.6).

Finally, the present system can be utilized using conventional email clients, e.g., Outlook. Using any conventional email client 1.3, a user can configure IMSI mail by appending "@imsimail.com" to the recipient's IMSI. POP3/IMAP and SMTP settings will be provided for the user at the imsimail.com website. Thus, an email can be sent to any IMSI by appending the extension "@imsimail.com" to the recipient's IMSI.

The figures in this disclosure are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiment, without undue experimentation, without departing from the general concept of the present invention. Such adaptations and modifications are therefore intended to be within the meaning and range of equivalents of the disclosed embodiments, based on the teaching and guidance presented herein.

While various embodiments of the present invention have been described above, it should be understood that they have beer presented by way of example, and not limitation. It would be apparent to one skilled in the relevant art(s) that various changes in form and detail could be made therein without departing from the spirit and scope of the invention. Thus, the present inventions should not be limited by any of the above described exemplary embodiments, but should be defined only in accordance with the following claims and their equivalents.

What is claimed is:

1. A method of providing an email service for an International Mobile Subscriber Identity (IMSI) for a sender and a recipient without a known email address, the method comprising the steps of:
   a. providing a remote server within a computer-based operating environment that includes access to a recording medium operable for the remote server;
   b. enabling said sender without the known email address and using a mobile device having a first IMSI to connect to the remote server, said step of enabling the sender to connect to the remote server further comprising providing a first email client application to the sender, the first email client application being operable to send and receive mail to/from other IMSIs through the remote server;
   c. enabling said recipient without the known email address and using a mobile device having a second IMSI to connect to the remote server, said step of enabling the recipient to connect to the remote server further comprising providing a second email client application to the recipient, the second email client application being operable to send and receive mail to/from other IMSIs through the remote server;
   d. using said first and second email client applications to send at least one of an email sending request, a mail box creation request and a mail box verification request from said sender and said recipient to the remote server;
   e. upon receipt of one of said requests, verifying whether a mail box exists at the remote server for said first and said second IMSI;
   f. where no mail box exist at the remote server for said first IMSI, providing a first mail box at the remote server enabling the sender to send and receive mail to/from other mobile devices having other IMSIs; and
   g. where no mail box exist at the remote server for said second IMSI, providing a second mail box at the remote server enabling the recipient to send and receive mail to/from other mobile devices having other IMSIs,
   wherein each of the first and second email client applications is at least one of an IMSI mail client application, an IMSI mail web client and a conventional email client, and wherein the method further comprises a step of configuring said conventional email client through pop/imap/smtp settings utilizing a format comprising an ISMI and an extension @imsimail.com.

2. The method according to claim 1, wherein the IMSI mail client application supports a mobile phone, a table or a personal computer.

3. The method according to claim 1, further comprising using the IMSI mail client application to
   i. perform a configuration during a first run of the IMSI mail client application;
   ii. send an email to any IMSI or email address;
   iii. synchronize said first or said second mail box;
   iv. view said first or said second mail box;
   v. configure mail forwarding to a traditional email address;
   vi. change access parameters to said first or said second mail box; and
   vii. associate additional IMSIs with said first or said second mail box.

4. The method according to claim 3, wherein, where said mobile device of the sender or the recipient is a mobile phone, the IMSI mail client application does not perform any additional action to accomplish said configuration during said first run.

5. The method according to claim 3, wherein, where said mobile device of the sender or the recipient is a device other than a mobile phone, the IMSI mail client application sends the first IMSI or the second IMSI and an assigned code to the remote server to accomplish said configuration during said first run.

6. The method according to claim 1, further comprising using the IMSI mail web client to
   i. sign in into the first or the second mail box;
   ii. send an email to any IMSI or email address;
   iii. view said first or said second mail box;
   iv. configure mail forwarding to a traditional email address;
   v. change access parameters to said first or said second mail box; and
   vi. associate additional IMSIs with said first or said second mail box.

7. The method according to claim 1, further comprising using the remote server to send a message to the sender and the recipient providing access details to the first mail box, to send a welcome email to the sender and the recipient and to verify existence of the first and the second mail box.

* * * * *